US006861844B1

(12) United States Patent
Verdeyen et al.

(10) Patent No.: US 6,861,844 B1
(45) Date of Patent: Mar. 1, 2005

(54) ELECTRON DENSITY MEASUREMENT AND PLASMA PROCESS CONTROL SYSTEM USING CHANGES IN THE RESONANT FREQUENCY OF AN OPEN RESONATOR CONTAINING THE PLASMA

(75) Inventors: Joseph T. Verdeyen, Savoy, IL (US); Wayne L. Johnson, Phoenix, AZ (US); Murray D. Sirkis, Tempe, AZ (US)

(73) Assignee: Tokyo Electron Limited, Tokyo (JP)

( * ) Notice: Subject to any disclaimer, the term of this patent is extended or adjusted under 35 U.S.C. 154(b) by 306 days.

(21) Appl. No.: 10/031,570

(22) PCT Filed: Jul. 20, 2000

(86) PCT No.: PCT/US00/19536

§ 371 (c)(1),
(2), (4) Date: Mar. 28, 2002

(87) PCT Pub. No.: WO01/06544

PCT Pub. Date: Jan. 25, 2001

(51) Int. Cl.[7] .................................... G01N 27/64
(52) U.S. Cl. .................................... 324/464
(58) Field of Search .................................... 324/464, 633, 324/636, 639, 647, 768, 459, 470, 471; 118/719; 356/450

(56) References Cited

U.S. PATENT DOCUMENTS 2,405,229 A 8/1946 Mueller et al.
2,483,189 A 9/1949 Eaglesfield
2,735,941 A 2/1956 Peck
2,971,153 A 2/1961 Wharton et al.

(List continued on next page.)

FOREIGN PATENT DOCUMENTS

| | | |
|---|---|---|
| EP | 0 432 573 | 6/1991 |
| WO | WO 01/06544 | 1/2001 |
| WO | WO 01/37306 | 5/2001 |

OTHER PUBLICATIONS

P. K. Atrey et al., "Measurement of chord averaged electron density in ADITYA using 100 GHz and 136 GHz interferometers", Indian J. Physics 66B (5 & 6), 1992, pp. 489–497.

D. Bora et al., "Plasma density measurement using a simple microwave technique", Rev. Sci. Instrum. 59 (10), Oct. 1988, pp. 2149–2151.

D. Bora et al., "A simple microwave technique for plasma density measurement using frequency modulation", Plasma Physics and Controlled Fusion 26 (7), 1984, pp. 853–857.

(List continued on next page.)

*Primary Examiner*—Guy J. Lamarre
*Assistant Examiner*—James C. Kerveros
(74) *Attorney, Agent, or Firm*—Oblon, Spivak, McClelland, Maier & Neustadt, P.C.

(57) ABSTRACT

A system for measuring plasma electron densities (e.g., in the range of 1010 to 1012 cm−3) and for controlling a plasma generator. Measurement of the plasma electron density is used as part of a feedback control in plasma-assisted processes, such as depositions or etches. Both the plasma measurement method and system generate a control voltage that in turn controls the plasma generator. A programmable frequency source sequentially excites a number of the resonant modes of an open resonator placed within the plasma processing apparatus. The resonant frequencies of the resonant modes depend on the plasma electron density in the space between the reflectors of the open resonator. The apparatus automatically determines the increase in the resonant frequency of an arbitrarily chosen resonant mode of the open resonator due to the introduction of a plasma and compares that measured frequency to data previously entered. The comparison is by any one of (1) dedicated circuitry, (2) a digital signal processor, and (3) a specially programmed general purpose computer. The comparator calculates a control signal which is used to modify the power output of the plasma generator as necessary to achieve the desired plasma electron density.

13 Claims, 6 Drawing Sheets

U.S. PATENT DOCUMENTS

| | | | | | |
|---|---|---|---|---|---|
| 3,265,967 | A | | 8/1966 | Heald | |
| 3,290,614 | A | | 12/1966 | Racy | |
| 3,383,509 | A | | 5/1968 | Goldstein et al. | |
| 3,388,327 | A | | 6/1968 | Sutton et al. | |
| 3,416,077 | A | | 12/1968 | Lacy | |
| 3,439,266 | A | | 4/1969 | Rogers | |
| 3,474,336 | A | | 10/1969 | Alford | |
| 3,490,037 | A | | 1/1970 | Williams | |
| 3,509,452 | A | | 4/1970 | Walker | |
| 3,572,948 | A | * | 3/1971 | Catherin | |
| 3,599,089 | A | | 8/1971 | Bugnolo | |
| 3,699,475 | A | * | 10/1972 | Rogers | |
| 3,885,874 | A | * | 5/1975 | Haas et al. | 356/450 |
| 3,899,752 | A | * | 8/1975 | Engelmann | |
| 3,952,246 | A | * | 4/1976 | Sprott et al. | |
| 3,956,695 | A | * | 5/1976 | Stamm | |
| 4,034,312 | A | * | 7/1977 | Armand | |
| 4,096,453 | A | * | 6/1978 | Rogers | |
| 4,354,166 | A | | 10/1982 | Grudkowski | |
| 4,540,955 | A | * | 9/1985 | Fiedziuszko | |
| 4,775,845 | A | * | 10/1988 | McCoy | |
| 4,899,100 | A | * | 2/1990 | Talanker et al. | |
| 4,944,211 | A | * | 7/1990 | Rowan et al. | |
| 4,949,053 | A | * | 8/1990 | Havens | |
| 5,082,517 | A | * | 1/1992 | Moslehi | |
| 5,245,405 | A | | 9/1993 | Mitchell et al. | |
| 5,304,282 | A | | 4/1994 | Flamm | |
| 5,383,019 | A | | 1/1995 | Farrell et al. | |
| 5,455,565 | A | | 10/1995 | Moeenziai et al. | |
| 5,506,475 | A | | 4/1996 | Alton | |
| 5,568,801 | A | | 10/1996 | Paterson et al. | |
| 5,621,331 | A | | 4/1997 | Smith et al. | |
| 5,691,642 | A | * | 11/1997 | Dobkin | 324/464 |
| 5,907,820 | A | | 5/1999 | Pan | |
| 5,936,413 | A | | 8/1999 | Booth et al. | |
| 5,939,886 | A | | 8/1999 | Turner et al. | |
| 5,945,888 | A | | 8/1999 | Weinert et al. | |
| 6,027,601 | A | * | 2/2000 | Hanawa | |
| 6,074,568 | A | | 6/2000 | Adachi et al. | |
| 6,260,408 | B1 | | 7/2001 | Vig et al. | |
| 6,339,297 | B1 | | 1/2002 | Sugai et al. | |

OTHER PUBLICATIONS

Nils Brenning, "An improved microwave interferometer technique for plasma density measurements:II", J. Phys. E: Sci. Instrum. 21, 1988, pp. 578–582.

N. Brenning, "A Improved microwave interferometer technique for plasma density measurements", J. Phys. E: Sci. Instrum. 17, 1984, pp. 1018–1023.*

M. A. G. Calderon et al., "Experimental study of a swept reflectometer with a single antenna for plasma density profile measurement", International Journal of Infrared and Millimeter Waves 6(7), 1985, pp. 605–628.*

G. D. Conway et al., "Plasma density fluctuation measurements from coherent and incoherent microwave reflection", Plasma Phys. Control Fusion 38, 1996, pp. 451–466.*

P. C. Efthimion et al., "1–millimeter wave interferometer for the measurement of line integral electron density on TFTR", Rev. Sci. Instrum. 56 (5), May 1985.*

J. A. Fessey et al., "Plasma electron density measurements from the JET 2 mm wave interferometer", J. Phys. E: Sci. Instrum. 20, 1987, pp. 169–174.

H. Kumar et al., "Measurements of plasma density in argon discharge by langmuir probe & microwave interferometer", Indian Journal of Pure & Applied Physics 17, May 1979, pp. 316–318.

G. Neumann et al., "Plasma–density measurements by microwave interferometry and Langmuir probes in an rf discharge", Rev. Sci. Instrum. 64 (1), Jan. 1993, pp. 19–25.

Lawrence J. Overzet et al., "Comparison of electron–density measurements made using a Langmuir probe and microwave interferometer in the Gaseous Electronics Conference reference reactor", J. Appl. Phys. 74 (7), Oct. 1, 1993.

John A. Thornton, "Diagnostic methods for sputtering plasmas", J. Vac. Sci. Technol. 15(2), Mar./Apr. 1978, pp. 188–192.

J. R. Wallington et al., "A sensitive microwave interferometer for plasma diagnostics", J. Plasma Physics 3 (part 3), 1969, pp. 371–375.

M. Havertag et al., "Measurements of negative ion densities in 13.56–MHz rf plasmas of $CF_4$, $C_2F_6$, $CHF_3$ and $C_3F_8$using microwave resonance and the photodetachment effect", J. Appl. Phys. 70 (7), Oct. 1, 1991, pp. 3472–3480.

M. Haverlag et al., "Negatively charged particles in fluorocarbon rf etch plasmas: Density measurements using microwave resonance and the photodetachment effect", Materials Science Forum, vol. 140–142, 1993, pp. 235–254.

G. R. Hanson et al., "Density fluctuation measurements in ATF using correlation reflectometry", Nuclear Fusion 32 (9), 1992, pp. 1593–1608.

G. R. Hanson et al., "A swept two–frequency microwave reflectometer for edge density profile measurements on TFTR", Rev. Sci. Instrum. 63 (10), Oct. 1992, pp. 4658–4660.

K. W. Kim et al., "Development of a fast solid–state high–resolution density profile reflectometer system on the DIII–D tokamak", Rev. Sci. Instrum. 68 (1), Jan. 1997, pp. 466–469.

P. Millot et al., "An advanced radar technique for electron density measurements on large tokamaks", Eighteenth International Conference on Infrared and Millimeter Waves, James R. Birch, Terence J. Parker, Editors, Proc. SPIE 2104, 1993, pp. 240–241.

Masaaki Nagatsu et al., "Application of maximum entropy method to density profile measurement via microwave reflectometry on GAMMA 10", Plasma Phys. Control. Fusion 38, 1996, pp. 1033–1042.

R. Nazikian et al., "Reflectometer measurements of density fluctuations in tokamak plasmas (Invited)", Rev. Sci. Instrum. 66 (1), Jan. 1995, pp. 392–398.

L. J. Overzet et al., "Enhancement of the plasma density and depositon rate in rf discharges", Appl. Phys. Lett. 48(11), Mar. 17, 1986, pp. 695–697.

R. Schubert, "Sensor for plasma density profile measurement in magnetic fusion machine", Sensors and Actuators A 41–42, 1994, pp. 53–57.

S. Shammas et al., "Simplified microwave measurement of uv photoplasmas"J. Appl. Phys. 51 (4), Apr. 1980, pp. 1970–1974.

A. C. C. Sips et al., "Analysis of reflectometry density profile measurements in JET", Plasma Phys. Control. Fusion 35, 1993, pp. 743–755.

W. Hess et al., "A new 1/ . . . 23 GHz cavity stabilized, hermetically sealed module VCO in chip technique", Conference Proceedings of the 22nd European Microwave Conference, vol. 1, Aug. 24–27, 1992, pp. 143–148. INSPEC abstract No. B9211–1350H–047.

H. Flugel et al., "Cavity stabilisation techniques for harmonic–mode oscillators", Proceedings of the eight colloquium on microwave communication, Aug. 25–29, 1986, pp. 393–394. INSPEC abstract No. B88050407.

Helmut Barth, "A high Q cavity stabilized Gunn oscillator at 94 GHz", 1986 IEEE MTT–S International Microwave Symposium Digest, Jun. 2–4, 1986, pp. 179–182. INSPEC abstract No. B87006105.

P. M. Marshall et al., "Simple technique cavity–stabilized VCO", Microwaves & RF 24 (7), Jul. 1985, pp. 89–92. INSPEC abstract No. B86014481.

M. E. Znojkiewicz, "8 GHz low noise bias tuned VCO", 1984 IEEE MTT–S International Microwave Symposium Digest, May 29–Jun. 1, 1984, pp. 489–491. INSPEC abstract No. B85017875.

A. Jacob et al., "Optimum design of cavity stabilized FET oscillators", Conference Proceedings of the 13th European Microwave Conference, Sep. 5–8, 1983, pp. 509–514. INSPEC abstract No. B84009181.

Brian E. Rose, "10 GHz cavity stabilized FET oscillator", Proceedings of the 32nd Annual Frequency Control Symposium, May 31–Jun. 2, 1978, pp. 385–388. INSPEC abstract No. B79030122.

Klaus Schunemann et al., "On the matching of transmission cavity stabilized microwave oscillators", IEEE transactions on microwave theory and techniques MTT–26 (3), Mar. 1978, pp. 147–155. INSPEC abstract No. B78028026.

Brian Owen, "Mechanically tuneable, cavity–stabilized millimeter–wave IMPATT oscillators", 1977 IEEE MTT–S International Microwave Symsposium Digest, 1977, pp. 22–25. INSPEC abstract No. B78005511.

Walter R. Day, "Frequency modulation of cavity stabilized solid state diode oscillators", 1973, IEEE–G–MTT International Microwave Symposium Digest of Technical Papers, Jun. 4–6, 1973, pp. 247–249. INSPEC abstract No. B74005473.

J. Clarke, "A simple stabilized microwave source", IEEE Transactions on Instrument and Measurement, vol. IM–21 (1), Feb. 1972, pp. 83–84. INSPEC abstract No. B72013995.

David I. C. Pearson et al., "A microwave interferometer for density measurement and stabilization in process plasmas", Materials Research Society Symposium Proceedings 117, Apr. 5–7, 1988, pp. 311–317.

M. Manso et al., "Localized density measurements on ASDEX using microwave reflectometry", Max–Planck–institut Plasmaphysik Technical Report IPP III/164, Paper No. R1, Sep. 1990, 4 pages.

A. Silva et al., "First density measurements with microwave reflectometry on ASDEX upgrade", Max–Planck–Institut Plasmaphysik Technical Report IPP 1/277, Oct. 1993, pp. 154–157.

Kai Chang, "Millimeter–wave spatial and quasi–optical power combining techniques", International conference on millimeter waves and far–infrared technology conference digest (Cat. No. 89TH0257–6), 1989, pp. 431–434.

Jin–Bang Tang et al., "Finite element analysis of the dielectric resonator", International conference on millimeter waves and far–infrared technology conference digest (Cat. No. 89TH0257–6), 1989, pp. 435–438.

I. V. Altukhov et al., "Far infared radiation from uniaxially compressed p–type GE", International conference on millimeter waves and far–infrared technology conference digest (Cat. No. 89TH0257–6), 1989, pp. 439–442.

Fu–Jiang Liao et al., "Developing status of millimeter wave tubes in China", International conference on millimeter waves and far–infrared technology conference digest (Cat. No. 89TH0257–6), 1989, pp. 443–446.

Li–Rong Jin et al., "D–band silicon IMPATT diode", International conference on millimeter waves and far–infrared technology conference digest (Cat. No. 89TH0257–6), 1989, pp. 447–449.

Sheng–Min Liu et al., "The millimeter wave Gunn oscillator and self–oscillating mixer using the nonradiative dielectric waveguide", International conference on millimeter waves and far–infrared technology conference digest (Cat. No. 89TH0257–6), 1989, pp. 450–452.

Wei Hong et al., "Study on broadband millimeter wave oscillators", International conference on millimeter waves and far–infrared technology conference digest (Cat. No. 89TH0257–6), 1989, pp. 453–456.

Dunfu Li et al., "Influence of moisture on cavity–stabilized oscillators", International conference on millimeter waves and far–infrared technology conference digest (Cat. No. 89TH0257–6), 1989, pp. 457–460.

D. Ni et al., "Millimeter–wave generation and characterization of a GaAs FET by optical mixing", International conference on millimeter waves and far–infrared technology conference digest (Cat. No. 89TH0257–6), 1989, p. 493.

Jing–Feng Miao et al., "New NRD guide oscillator", International conference on millimeter waves and far–infrared technology conference digest (Cat. No. 89TH0257–6), 1989, pp. 494–496.

Yu–Fen Yang et al., "8mm pulse IMPATT oscillators", International conference on millimeter waves and far–infrared technology conference digest (Cat. No. 89TH0257–6), 1989, pp. 497–499.

Ning Chen et al., "Novel large signal mathematical model of mm–wave Gunn device", International conference on millimeter waves and far–infrared technology conference digest (Cat. No. 89TH0257–6), 1989, pp. 500–502.

Wang Donglin et al., "VCO for millimeter–wave phase–locked sources", International conference on millimeter waves and far–infrared technology conference digest (Cat. No. 89TH0257–6), 1989, pp. 503–505.

Wang Dongjin, "A new viewpoint on the operation principles of the reflection type cavity–stabilized Gunn oscillator", International conference on millimeter waves and far–infrared technology conference digest (Cat. No. 89TH0257–6), 1989, pp. 506–509.

S. P. Kuo et al., "Operation of a sixteenth harmonic Cusptron oscillator", International conference on millimeter waves and far–infrared technology conference digest (Cat. No. 89TH0257–6), 1989, pp. 510–513.

Igor Alexelf et al., "Recent developments in the Orbitron MASER", International conference on millimeter waves and far–infrared technology conference digest (Cat. No. 89TH0257–6), 1989, pp. 583–587.

V. K. Malyutenko et al., "Thermal–emitting diodes for IR", International conference on millimeter waves and far–infrared technology conference digest (Cat. No. 89TH0257–6), 1989, pp. 588–590.

Valentin M. Feru et al., "An absolute radiometric evaluation of the spectral irradiance created by the optical radiation sources", International conference on millimeter waves and far–infrared technology conference digest (Cat. No. 89TH0257–6), 1989, p. 591.

V. I. Gavrilenko et al., "Negative cyclotron amss MASER—A new type of semiconductor generator for millimeter and submillimeter wave range", International conference on millimeter waves and far–infrared technology conference digest (Cat. No. 89TH0257–6), 1989, pp. 592–598.

E. V. Beregulin et al., "Saturation absorption of the IR–FIR radiation in semiconductors and its technical utilization", International conference on millimeter waves and far–infrared technology conference digest (Cat. No. 89TH0257–6), 1989, pp. 597–600.

I. E. Aronov et al., "Radiowave excitation of resonant D. C. electromotive force in metals", International conference on millimeter waves and far–infrared technology conference digest (Cat. No. 89TH0257–6), 1989, p. 601.

M. V. Burtyka et al., "Instability of electromagnetic oscillations of the millimeter wave range specified by injection of charge carrier in inhomogeneous semiconductor structures", International conference on millimeter waves and far–infrared technology conference digest (Cat. No. 89TH0257–6), 1989, pp. 602–605.

L. Dunfu et al., "Stability condition for 8mm phase–locked source", International conference on millimeter waves and far–infrared technolgy conference digest (Cat. No. 89TH0257–6), 1989, pp. 606–609.

Wanjun Bi et al., "Experimental study of an overmode power combiner of 8mm IMPATT diodes", International conference on millimeter waves and far–infrared technology conference digest (Cat. No. 89TH0257–6), 1989, pp. 610–613.

Hua–fang Zhang et al., "Varactor–tuned Ka–band Gunn oscillator", International conference on millimeter waves and far–infrared technology conference digest (Cat. No. 89TH0257–6), 1989, pp. 614–616.

A. A. Lavrinovich "7mm traveling–wave MASER with gain bandwidth exceeding 200 MHz", International conference on millimeter waves and far–infrared technology conference digest (Cat. No. 89TH0257–6), 1989, pp. 617–618.

Th G van de Roer, et al., Journal of Physics E: Scientific Instruments, vol. 3, No. 2, pp. 98–100, XP–001098603, "Automatic Display of Electron Density in a Plasma Column", Feb. 1970.

R. E. Eaves, et al., IEEE Transactions on Antennas and Propagation, vol. AP–19, No. 2, p. 221–226, XP–001097480, "Determination of Plasma Electron–Density Distribution from the Resonant Frequencies of a Parallel–Plate Cavity", Mar. 1971.

Johnson et al., US 2002/0125233, "Radio Frequency Power Source for Generating an Inductively Coupled Plasma", Sep. 12, 2002.

* cited by examiner-

ELECTRON DENSITY MEASUREMENT AND PLASMA PROCESS CONTROL SYSTEM USING CHANGES IN THE RESONANT FREQUENCY OF AN OPEN RESONATOR CONTAINING THE PLASMA

CROSS-REFERENCE TO RELATED APPLICATIONS

The present application is related to co-pending applications entitled "ELECTRON DENSITY MEASUREMENT AND PLASMA PROCESS CONTROL SYSTEM USING A MICROWAVE OSCILLATOR LOCKED TO AN OPEN RESONATOR CONTAINING THE PLASMA," Ser. No. 60/144,878 and "ELECTRON DENSITY MEASUREMENT AND PLASMA PROCESS CONTROL SYSTEM USING A MICROWAVE OSCILLATOR LOCKED TO AN OPEN RESONATOR CONTAINING THE PLASMA," Ser. No. 60/144,880 both of which have been filed concurrently herewith. Both of those applications are herein incorporated by reference in their entirety.

BACKGROUND OF THE INVENTION

1. Field of the Invention

The present invention provides a method and system for measuring and controlling electron densities in a plasma processing system, such as is used in semiconductor processing systems.

2. Description of the Background

Known microwave-based techniques for determining plasma electron densities include: (1) microwave interferometry, (2) measurement of reflection and absorption, and (3) perturbation of cavity resonant frequencies. Microwave interferometry involves the determination of the phase difference between two microwave beams. The first beam provides a reference signal, and the second beam passes through a reactive environment and undergoes a phase shift relative to the first beam. The index of refraction is calculated from the measured change in the phase difference between the two beams. The interferometric technique has been document by Professor L. Goldstein of the University of Illinois at Urbana. Interferometry is described in the following U.S. Pat. Nos.: 2,971,153; 3,265,967; 3,388,327; 3,416,077; 3,439,266; 3,474,336; 3,490,037; 3,509,452; and 3,956,695, each of which is incorporated herein by reference. Examples of other non-patent literature describing interferometry techniques include: (1) "A Microwave Interferometer for Density Measurement Stabilization in Process Plasmas," by Pearson et al., Materials Research Society Symposium Proceedings, Vol. 117 (Eds. Hays et al.), 1988, pgs. 311–317, and (2) "1-millimeter wave interferometer for the measurement of line integral electron density on TFTR," by Efthimion et al., Rev. Sci. Instrum. 56 (5), May 1985, pgs. 908–910. Some plasma properties may be indirectly determined from measurements of the absorption of a microwave beam as it traverses a region in which a plasma is present. Signal reflections in plasmas are described in U.S. Pat. Nos. 3,599,089 and 3,383,509.

Plasma electron densities have also been measured using a technique which measures the perturbations of cavity resonant frequencies. The presence of a plasma within a resonator affects the frequency of each resonant mode because the plasma has an effective dielectric constant that depends on plasma electron density. This technique has been documented by Professor S. C. Brown of the Massachusetts Institute of Technology. Portions of this technique are described in U.S. Pat. No. 3,952,246 and in the following non-patent articles: (1) Haverlag, M., et al., J. Appl Phys 70 (7) 3472–80 (1991): Measurements of negative ion densities in 13.56 MHZ RF plasma of $CF_4$, $C_2F_6$. $CHF_3$, and $C_3F_8$ using microwave resonance and the photodetachment effect; and (2) Haverlag, M., et al., Materials Science Forum, vol. 140–142, 235–54 (1993): Negatively charged particles in fluorocarbon RF etch plasma: Density measurements using microwave resonance and the photodetachment effect.

SUMMARY OF THE INVENTION

It is an object of the present invention to provide a more accurate plasma measuring system than the prior art.

It is a further object of the present invention to provide an improved plasma measuring system using plasma induced changes in the frequencies of an open resonator.

These and other objects of the present invention are achieved using a voltage-controlled programmable frequency source that sequentially excites a number of the resonant modes of an open resonator placed within the plasma processing apparatus. The resonant frequencies of the resonant modes depend on the plasma electron density in the space between the reflectors of the open resonator. The apparatus automatically determines the increase in the resonant frequency of an arbitrarily chosen resonant mode of the open resonator due to the introduction of a plasma and compares that measured frequency to data previously entered. The comparison is by any one of (1) dedicated circuitry, (2) a digital signal processor, and (3) a specially programmed general purpose computer. The comparator calculates a control signal which is used to modify the power output of the plasma generator as necessary to achieve the desired plasma electron density.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
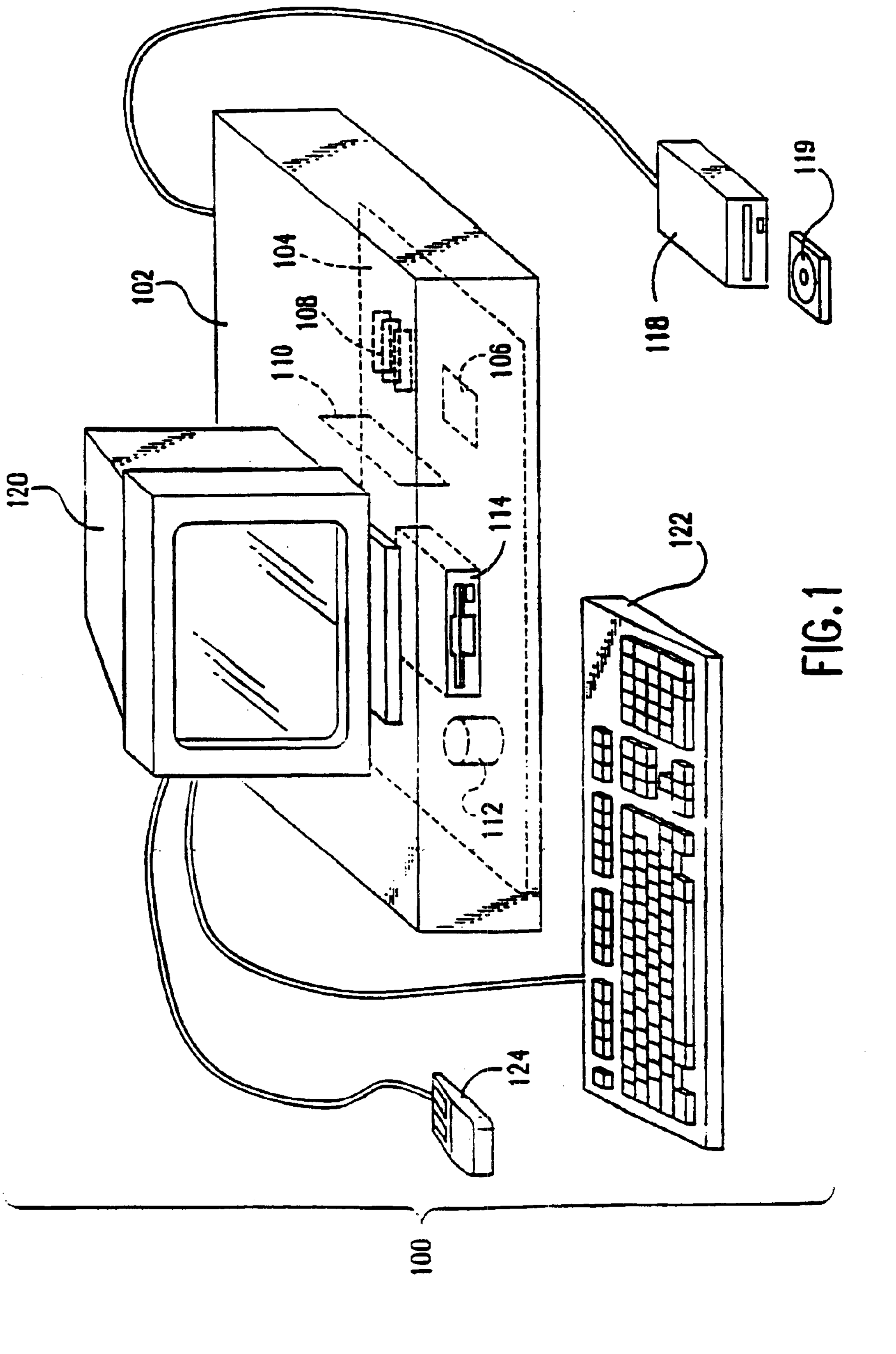
FIG. 1 is a schematic illustration of a computer system for implementing the measurement and control of the present invention.

Referring now to the drawings, wherein like reference numerals designate identical or corresponding parts throughout the several views, FIG. 1 is a schematic illustration of an embodiment of a measurement and control system, according to the present invention, for a plasma processing system. In this embodiment, a computer 100 implements the method of the present invention, wherein the computer housing 102 houses a motherboard 104 which contains a CPU 106, memory 108 (e.g., DRAM, ROM, EPROM, EEPROM, SRAM and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or an Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of frequency graphs showing resonant frequencies of the open resonator.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further include the computer program product of the present invention for controlling a plasma processing system. The computer code devices of the present invention can be any interpreted or executable code mechanism, including but not limited to scripts, interpreters, dynamic link libraries, Java classes, and complete executable programs.

In an alternate embodiment, the computer 100 includes a digital signal processor (not shown) for performing signal processing on received inputs. In yet another alternate embodiment, the CPU 106 is programmed with software to perform digital signal processing routines analogous to the Internal operation of a DSP. In a further embodiment, the computer 100 is replaced by a DSP and memory (e.g., on a printed circuit board) for performing the operations of the computer described herein. Likewise, the functions of the DSP may be replaced by dedicated analog and/or digital circuitry for performing the operations described herein.

Figure 2:
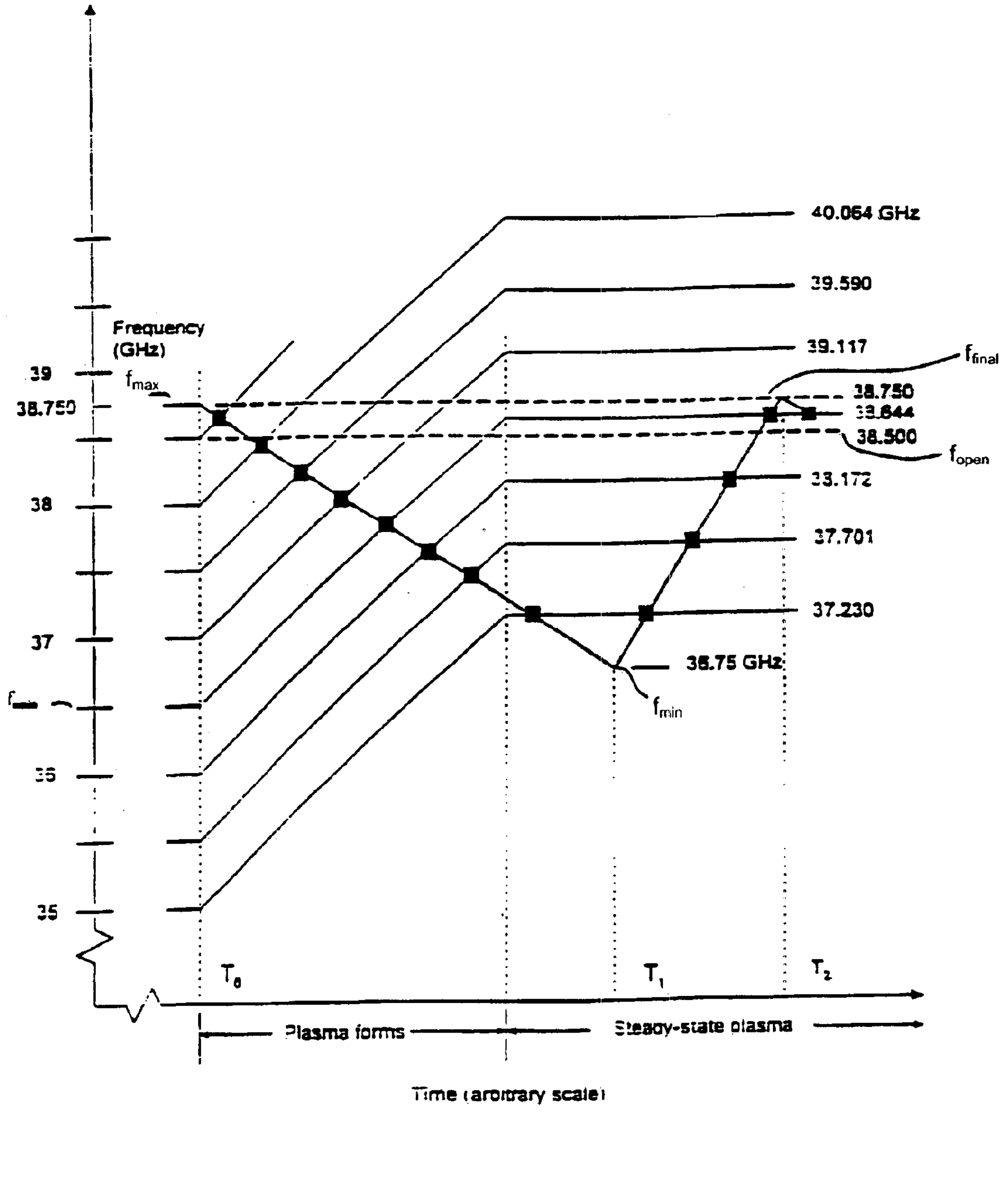
FIG. 2 is a graph of the sequential excitation of the modes of an open resonator by the sweep of the frequency of the programmable frequency source while the resonant frequencies of the modes are being shifted due to the formation of the plasma.
Figure 3:
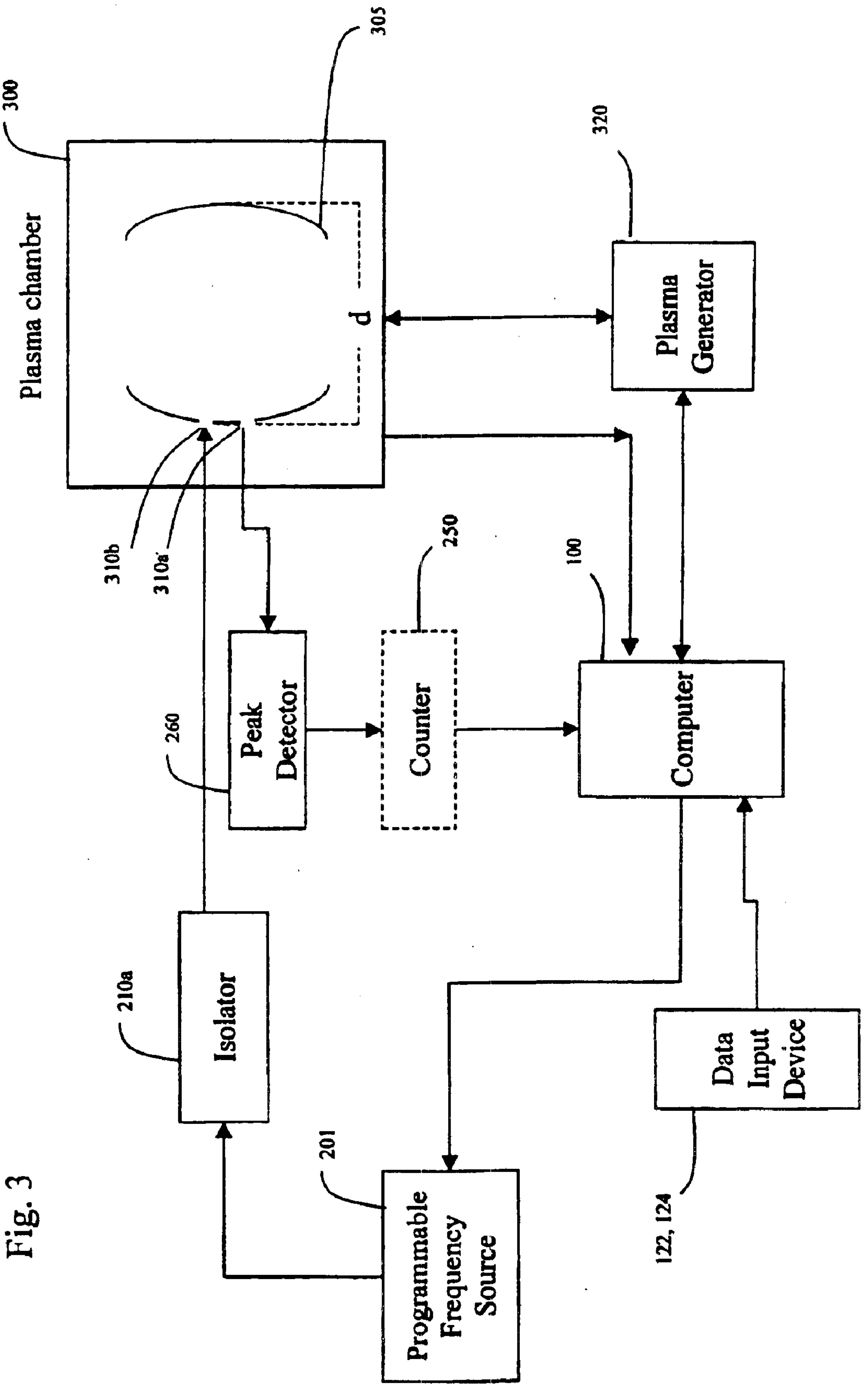
FIG. 3 is a block diagram of a circuit for measuring and controlling plasma electron density according to the present invention.

As shown in FIG. 3, the computer 100 is programmed to measure a plasma electron density and control a programmable frequency source (PFS) 201. One embodiment of a programmable frequency source includes a D/A converter coupled to a voltage-controlled frequency modulated microwave oscillator. However, the frequencies applied by the programmable frequency source 201 depend on the behavior of the resonant frequencies of the open resonator modes as the plasma is established by the plasma generator 320. For purposes of the description of FIG. 2, it is assumed that the plasma electron density increases monotonically from its initial value to its final value (e.g., $2\times10^{12}$ $cm^{-3}$). As a non-limiting example, it is also assumed that the mode spacing in the empty (i.e., evacuated) resonator 305 is approximately c/2d=500 MHZ, where c is the speed of light in vacuum and d is the reflector spacing, i.e., the spacing between the reflectors. As shown in FIG. 2, the mode spacing with the plasma present is c/(2nd), where n is the index of refraction. If the index of refraction is not uniform as a function of position, n may be replaced by <n>, its mean value along an appropriate path between the reflectors. The spacing is not quite uniform because the index of refraction depends very slightly on the frequency as well as on the plasma electron density and spurious sources of phase shift associated with the coupling apertures.

To control the plasma processing system, the system determines a final operating frequency at which the system is to operate to establish and maintain a desired plasma electron density. The final operating frequency is determined as follows. At the time $T_0$, just as the plasma begins to form, the computer 100 sets the frequency of the programmable frequency source 201 to a predetermined maximum frequency, $f_{max}$ (e.g., 38.75 GHz). The computer 100 then decreases the frequency with respect to time (e.g., by changing a digital control signal output by the computer 100). In the illustrated embodiment, the decrease is linear, but in practice, the decrease can be either linear or non-linear, but in either case, it should be repeatable and thus predicatable. The frequency of the programmable frequency source 201 is decreased until it reaches a minimum frequency, $f_{min}$, (e.g., 36.75 GHz) at the time $T_1$, which is just after the plasma has essentially attained its steady-state density $2\times10^{12}$ $cm^{-3}$. The selection of the frequencies $f_{max}$ and $f_{min}$ are somewhat arbitrary. They are chosen in the microwave spectrum and about a nominal frequency convenient for microwave apparatus, i.e., ~35 GHz. If the maximum frequency has been arbitrarily chosen to be 38.75 Ghz, then choosing $f_{min}$ to be 36.75 Ghz is such that eight resonant modes are observed over the frequency range $f_{min}<f<f_{max}$ in the resonant cavity without a plasma. The minimum number of modes scanned is determined by (1) the method of sweeping the frequency (with linear or non-linear changes) with time and (2) the time over which the frequency is swept. Furthermore, the microwave apparatus can have a range within which it may be varied (limited by hardware constraints). The time over which the frequency is swept should be greater than the plasma adjustment period (formation time $T_1-T_0$) to give meaningful results. The sweep time scale includes the decreasing and increasing sweeps. In a first embodiment, R is assumed that the plasma electron density between times $T_0$ and $T_1$ is monotonically increasing so that number of modes passed while increasing or decreasing the sweeping frequency is counted property.

Generally, the resonances are indicated by a greatly enhanced value of the transmitted microwave energy and are counted as the frequency of the programmable frequency source 201 is decreased over the defined range. Likewise, when increasing the frequency from the programmable frequency source 201 over the defined range, the modes are counted and correlated with the modes counted during the decrease. During the decrease in frequency, the system detects the appearance of resonant frequencies in the open resonator and records the frequencies of the oscillator which produced the resonant frequencies. FIG. 2 is a graph of the sequential excitation of the modes of an open resonator by the sweep of the frequency of the programmable frequency source while the resonant frequencies of the modes are being shifted due to the formation of the plasma. In the example of FIG. 2, eight resonances of the open resonator are excited as the frequency of the programmable frequency source 201 decreases from its maximum frequency, $f_{max}$, to its minimum frequency, $f_{min}$.

Having decreased the programmable frequency source 201 to its minimum frequency, the system then increases the frequency of the programmable frequency source 201 with respect to time until, at the time $T_2$, the frequency again reaches the maximum frequency, $f_{max}$. As during the decrease, resonant frequencies are detected and recorded, and the increase may either be linear, as shown in FIG. 2, or non-linear with respect to time. The time between $T_1$ and $T_2$ is called the retrace time. During the retrace time of FIG. 2, four resonant frequencies of the open resonator are excited. The system determines the difference between the number of resonant frequencies during the decrease and the increase. This difference is the integer part of a characteristic called the fringe order. In the example of FIG. 2, the difference is four.

The fractional part of the fringe order is obtained in part from the difference between (a) the frequency, $f_{final}$, of the final resonant frequency excited (e.g., $f_{final}$=38.644 GHz in FIG. 2) and (b) the highest resonant frequency of the empty open resonator that is also less than $f_{final}$. In this case, that frequency, $f_{open}$, is 38.500 GHz, and is determined by performing a calibration, run apriori to determine the mode spacing and the frequencies of the resonant modes. Calibration is done when no plasma is present within the chamber. This is an accurate measurement and check of the mode spacing given by c/2d and the resonant frequencies present when there exists no plasma (i.e., f(q)=(c/2d)(q+½)). The difference is divided by the mode spacing of the empty open resonator (e.g., 0.5 GHz). Thus, the fractional part of the fringe order is given by:

$$\frac{f_{final}-f_{open}}{\text{mode spacing}}=\frac{38.644-38.5}{0.5}=0.288$$

The entire fringe order is then 4.288, and the frequency shift of the mode is 4.288×(mode spacing)=4.288×0.500 GHz =2.144 GHz.

Just as the system calculates the open resonant frequency, $f_{open}$, below the final frequency, $f_{final}$, the system also determines the open resonator frequency, $f_{omin}$, just below the minimum frequency, $f_{min}$. The value of the index of refraction in the steady-state condition is then calculated according to:

$$\frac{f_{omin}}{f_{final}}=\frac{36.5}{38.644}=0.945.$$

A more concrete example is explained hereafter with reference to FIG. 2. Starting from a point on the mode characteristic for which the resonant frequency is 38.644 GHz (near the right side of FIG. 2) an imaginary line is drawn down to the dashed horizontal line at 38.500 GHz. This drop corresponds to a frequency change of 0.144 GHz. Then, when moving to the left to the axis of ordinates along the 38.500 GHz line, there is a drop of four mode spaces of the empty open resonator, i.e., 4×0.500 GHz =2.000 GHz, to reach 36.500 GHz. Note that 36.500 GHz is the starting resonant frequency of the mode characteristic that ends with a resonant frequency of 38.644 GHz. It should be noted that a one-to-one correspondence exists between the frequency vs. time plot of FIG. 2 and a plot of the voltage controlling the programmable frequency source 201 vs. time. Thus, it is quite reasonable to interpolate between the several curves in the manner described herein.

Figure 5A:
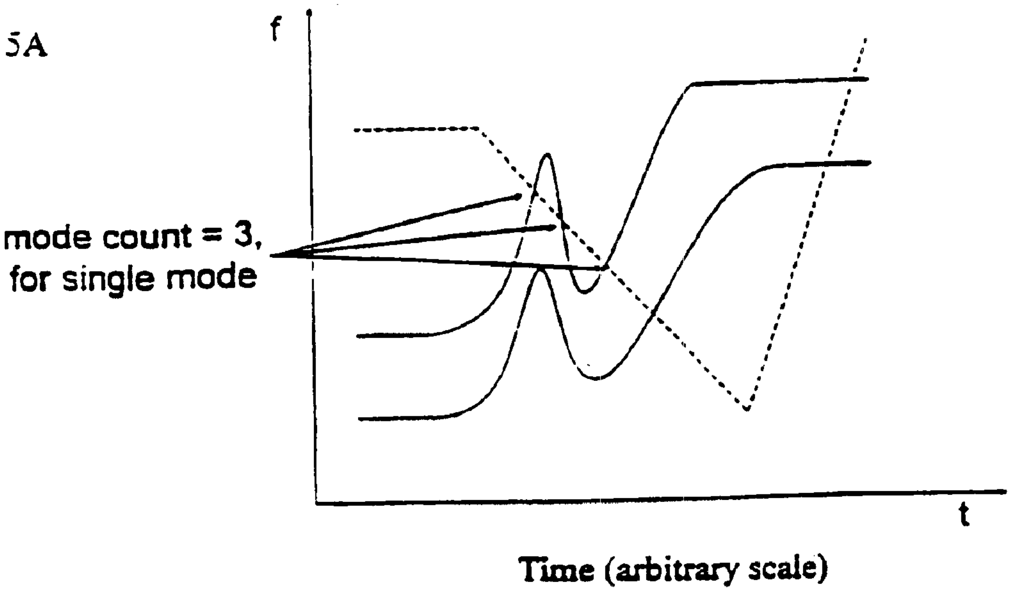
FIGS. 5A and 5B are graphs that illustrate the problems with a non-monotonic change in the plasma electron density.
Figure 5B:
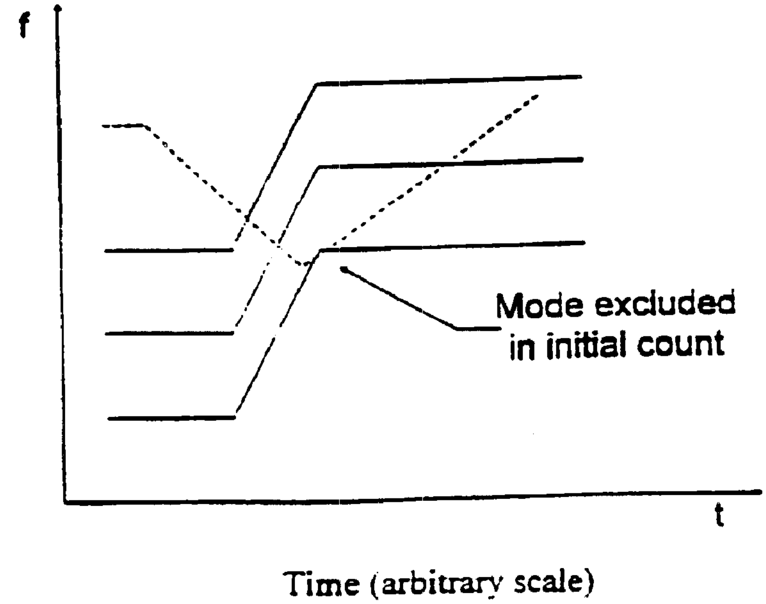

In an alternate embodiment, if the plasma electron density does not increase monotonically during the period when the plasma forms, the procedure described above is modified. The decrease in the frequency of the programmable frequency source 201 during the time period between $T_0$ and $T_1$ must be controlled in such a way that no mode of the open resonator is excited more than once. Likewise, during the retrace time between $T_1$ and $T_2$, the increase in the frequency of the programmable frequency source 201 is controlled so that no mode of the open resonator is excited more than once. FIGS. 5A and 5B Illustrate non-monotonically changing curves which are analyzed differently than the monotonically changing curves. FIG. 5A illustrates that it is improper to count the same mode more than once. Likewise, FIG. 5B shows it is improper to count a mode during the increase of the frequency of the programmable frequency source 201 that was not counted during the decrease of the swept frequency.

A first technique to assure that no mode is counted more than once while the frequency of the programmable frequency source 201 is decreasing or more than once while the frequency of the programmable frequency source 201 is increasing depends on the relationship between the slope of the open resonator mode frequency characteristics, $df_{orm}/dt$, and the slope of the frequency characteristic, $df_{PFS}/dt$, where t is the time, of the programmable frequency source 201. FIG. 2 illustrates the significance of the times to which references are made below.

$T_0<t<T$. The slope of the PFS frequency characteristic, $df_{PFS}/dt$ is to be more negative than the most negative value of the slope of any open resonator mode frequency characteristic, $df_{orm}/dt$, which it intersects.

$T_1<t<T_2$. The slope of the PFS frequency characteristic, $df_{PFS}/dt$, is to be more positive than the most positive value of the slope of any open resonator mode frequency characteristic, $df_{orm}/dt$, which it intersects.

As indicated in FIG. 2, ft is presumed that the steady-state condition has been attained by the time $T_1$.

It is well known that the index of refraction n and the plasma electron density N may be related to one another by the following approximate formula:

$$n=\sqrt{1-\frac{Ne^2}{\varepsilon_0 m(2\pi f)^2}}=\sqrt{1-\left(\frac{f_p}{f}\right)^2},$$

where e is the magnitude of the charge of an electron, m is the mass of an electron, $\epsilon_o$, is the permittivity of free space, and $f_p$ is the plasma frequency. If the equation:

$$\left(\frac{f_p}{f}\right)^2\in 1$$

also is true, which it is in the example, it follows that:

$$n=1-\frac{e^2}{8\pi^2\varepsilon_0 m f^2}N$$

and $$N = \frac{8\pi^2 \varepsilon_0 m f^2}{e^2}(1 - n).$$

As discussed above, if the index of refraction is not uniform as a function of position, n may be replaced by <n>, its mean value along an appropriate path between the reflectors, and N becomes <N>, its corresponding mean value.

Returning now to the description of FIG. 3, FIG. 3 shows the computer of FIG. 1 as part of the overall plasma processing system. The frequency of the programmable frequency source 201 is controlled by the computer 100 by varying a digital output signal applied to the programmable frequency source 201. (In an alternate embodiment of the present invention, the programmable frequency source 201 receives an analog input, in which case the computer 100 includes or is connected to a digital-to-analog convertor for providing the analog signal to the programmable frequency source 201.) The PFS 201 is connected to an isolator 210*a* which isolates the programmable frequency source 201 from the plasma chamber 300. The isolator 210*a* couples an output signal through an iris 310*b* of an open resonator 305 contained with the plasma chamber 300. The signal reflected back through the iris 310*a* is coupled to a peak detector 260.

During operation of one embodiment, the computer 100 samples time-dependent inputs from the plasma chamber 300, the plasma generator 320, and a counter 250. (In an alternate embodiment, the counter 250 is moved internal to the computer 100 and the computer uses the output of the peak detector 260 to detect peaks directly—e.g., using interrupts.) Between time $T_0$ and time $T_1$, each time a resonance frequency of the open resonator 305 is excited, a peak in the reflected microwave signal of the open resonator 305 is detected. This peak increases a count of the counter 250 which counts a number of peaks since the last reset signal. Thus, as the frequency of the PFS 201 decreases, the number of modes excited is counted and stored, either in the counter 250 or in the computer 100. For the graph shown in FIG. 2, the count would be eight. After the time $T_1$, when the PFS frequency begins to Increase, the count of the number of resonances as the frequency of the PFS increases is made. For the graph shown in FIG. 2, the count would be four. When the PFS has returned to its maximum frequency, $f_{max}$ (e.g., 38.75 GHz In FIG. 2), the computer 100 begins a search procedure with the aid of the peak detector 280 to return to the final resonance detected. The computer 100 then locks on to $f_{final}$ with the aid of the peak detector 260 and appropriate software. The frequency $f_{final}$ is measured and stored.

Having determined the number of detected resonance frequencies detected between $T_0$ and $T_1$ and between $T_1$ and $T_2$, the computer 100 calculates the fringe order (e.g., 4.288). In order to calculate the corresponding frequency shift, however, the computer 100 also needs the frequency difference between adjacent modes for the empty open resonator, i.e., the mode spacing.

Figure 4:
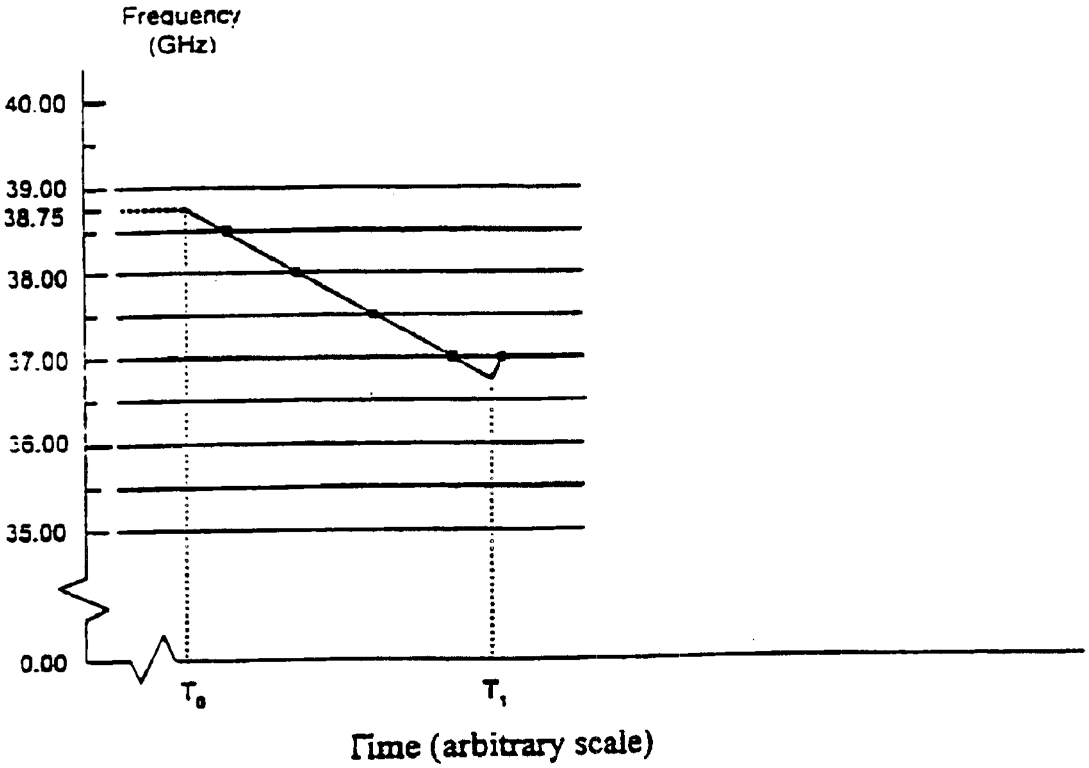
FIG. 4 is a graph that is similar to FIG. 2, but without the presence of the plasma shifting the resonances to higher frequencies.

The mode spacing is obtained in advance during a calibration process that is similar to the procedure by which the fringe order was obtained. FIG. 4, which is similar to FIG. 2, depicts, for the resonance frequencies in an empty open resonator, the modal characteristics which are horizontal and spaced 500 MHz apart for the example considered herein. At the time $T_0$, the frequency of the PFS 201 is decreased and then, at the time $T_1$, the frequency begins to return to its steady-state value. In this case, however, the computer 100 (1) counts the number of modes excited as the frequency decreases, (2) locks on to the first mode detected, and (3) records the locked frequency. After the frequency has started to increase, the computer 100 searches for and locks on to the final resonance frequency detected with the aid of the peak detector 260 and appropriate software. The computer 100 also measures and stores the final resonance frequency detected.

Based on the data collected during the calibration process and the data sampled during operation, the computer 100 calculates the mode spacings for the empty open resonator 305 and the frequency associated with each resonance for frequencies of interest here.

A more detailed description of the sequence of operations of the apparatus is described below.

(1) As on optional preliminary step, an equipment operator may elect to monitor that the programmable frequency source is operating within specifications. However, if the operator is confident that the system is operating correctly, this step can be omitted.

(2) The equipment operator then selects the operating parameters under which the plasma chamber 300 is to operate. The parameter and the sequence of operation are selected via a data input device (e.g., keyboard 122, mouse 124, or other control panel). The parameters include, but are not limited to, one or more of the following: a desired plasma electron density, a desired index of refraction, the process duration, and the gas to be used.

(3) After having entered all required data, the operator initiates the process through a data input device.

(4) The computer 100 controls the calibration of the empty open resonator as described above.

(5) The computer 100 controls ignition of a plasma in the open resonator 305. As the plasma forms, the computer 100 evaluates (1) inputs (e.g., reflected power) sent to it from the plasma generator 320 and (2) Inputs (e.g., optical emissions) sent to it from the plasma chamber 300. The computer 100 controls the frequency of the PFS 201 as described above with reference to FIG. 2.

(6) The computer 100 calculates the fringe order.

(7) The computer 100 calculates the index of refraction n or <n>.

(8) The computer 100 calculates the plasma electron density N or <N>.

(9) The computer 100 compares the measured/calculated plasma electron density with the value previously entered by the operator at the operator entry port.

(10) The computer 100 sends a control signal to the plasma generator 320 to change its output as necessary to maintain the desired plasma electron density.

(11) The computer 100 repeats steps (6)–(10) throughout the process to keep the plasma electron density at the desired level.

In addition to the above uses, the system must also accommodate an operators desire to return the system to another state at an arbitrary time. For example, the equipment operator may determine that the electron (plasma) concentration is not optimum for the intended purpose and may want to adjust the concentration. The procedure to be followed will depend on the technique used to track open resonator modes during start-up. The operator enters, by means of a control console (either local or remote), the value of the desired end parameter (mean index of refraction, electron density, etc., depending on the design of the control console) to be modified.

Figure 6:
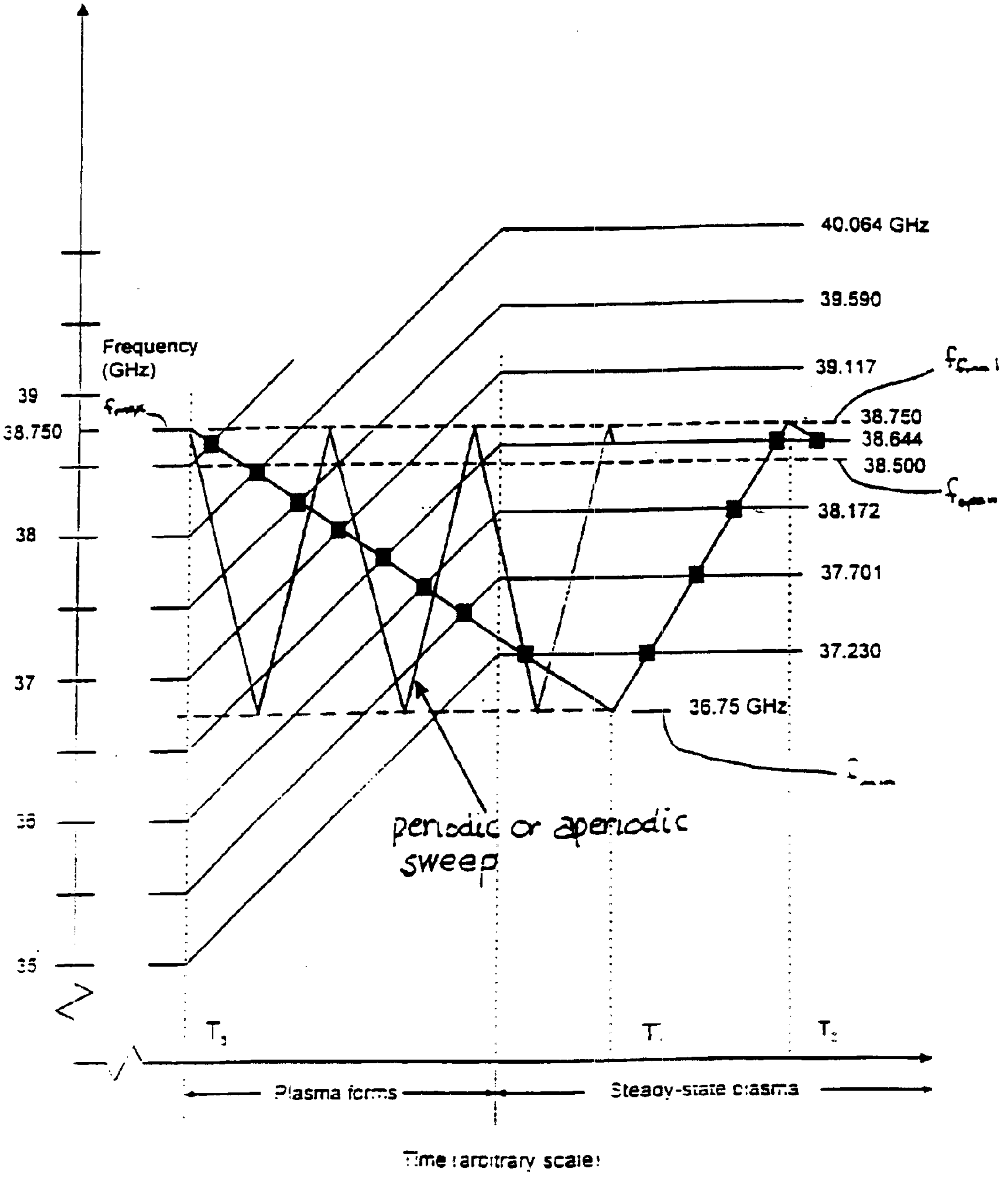
FIG. 6 is a graph of the sequential excitation of the modes of an open resonator by sweeping the frequency of the programmable frequency source a number of times in series while the resonant frequencies of the modes are being shifted due to the formation of the plasma.

Although the above description was given assuming a simplified frequency response during plasma initiation, such a response may not occur. A second technique assures that no mode is counted more than once while the frequency of the programmable frequency source 201 is decreasing or more than once while the frequency of the programmable frequency source 201 is increasing. The second technique is similar to the first technique described above but uses a different sweeping technique. The frequency of the programmable frequency source 201 is decreased and increased sequentially a number of times during the time from $T_0$ to $T_2$, as shown in FIG. 6. The sweep can be either periodic or aperiodic. The dependence of the frequency of the programmable frequency source 201 on time is such that the slope of the frequency characteristic satisfies criteria analogous to those enumerated above for the first technique. That is, when the slope of the frequency characteristic, $df_{PFS}/dt$, is negative, it is to be more negative than the most negative value of the slope of any open resonator mode frequency characteristic, $df_{orm}/dt$, which it intersects. Likewise, when the slope of the frequency characteristic, $df_{PFS}/dt$, is positive, it is to be more positive than the most positive value of the slope of any open resonator mode frequency characteristic, $df_{orm}/dt$, which it intersects. These slope conditions are, in general, more easily satisfied in this second technique than in the first, because the time increments during which the frequency of the programmable frequency source 201 decreases or increases are only a small fraction of the time interval between $T_0$ and $T_2$.

In this second technique the modes are counted as in the first technique but for the entire sequence of frequency sweeps. After the steady-state plasma electron density has been attained, the fractional part of the fringe order is determined as described previously for a monotonically increasing plasma electron density.

A third technique employs a frequency-time characteristic of the programmable frequency source 201 such that during start-up no mode is excited in the open resonator in the time interval between $T_0$ and $T_2$, as shown in FIG. 2. Such a frequency-time characteristic corresponds to no mode shift; i.e., the integer part of the fringe order is zero and need not be considered further. The fractional part of the fringe order can be determined as described previously for a monotonically increasing plasma electron density.

The implementation of this technique requires that the computer 100 be programmed to provide a suitable frequency-time characteristic. An appropriate program can be determined empirically by examining the mode excitations during start-up and changing the program to eliminate them one-by-one, starting with the one first excited after start-up begins.

If the equipment uses the first or second technique to identify mode changes as described above, the PFS sweep is reinitiated and the calibration data and start-up mode data stored in the computer from the immediately preceding start-up are used by the computer to calculate the consequent end parameter change. Such an end parameter may, for example, correspond to an plasma electron density. The computer starts the PFS sweep immediately before it begins to respond to the changed input data. The amount of lead time depends on the various response times of the equipment Using the techniques described above, the system can track mode changes generally using a PFS sweep. The system thus determines both the integer and fractional part of any consequent fringe change.

The accuracy of this procedure is limited by the accuracy with which the frequencies involved in the calculations can be measured. The system essentially calculates the index of refraction n or <n> from the differences of measured frequencies, and these may be difficult to measure with an accuracy better than 0.05%. If this is the case, the index of refraction may be accurate only to about 0.10%, because it is calculated from the ratio of two measured frequencies. Assuming that the index of refraction for a particular case is actually 0.93 (which corresponds to a plasma electron density on the order of $1\times10^{12}$ $cm^{-3}$), the measured value might be expected to lie between 0.929 and 0.931. The plasma electron density is proportional to $(1-n)$ which lies between 0.069 and 0.071 for the example of FIG. 2. Thus, the accuracy with which the plasma electron density may be determined is on the order of 0.001/0.070=1.4%.

As would be evident to one of ordinary skill in the art, the greater the number of modes swept without a plasma, the better the resolution and robustness of the system.

Obviously, numerous modifications and variations of the present invention are possible in light of the above teachings. It is therefore to be understood that, within the scope of the appended claims, the invention may be practiced otherwise than as specifically described herein.

What is claimed is:

1. A system for measuring a plasma electron density in a plasma chamber, the system comprising:

a plasma chamber containing a plasma;

a frequency source for providing a signal to the plasma chamber such that the signal sweeps in decreasing frequency direction and then sweeps in an increasing frequency direction;

a resonance frequency detector for detecting a first set of resonance frequencies excited by the decreasing frequency sweep and detecting a second set of resonance frequencies excited by the increasing frequency sweep;

a comparator for determining a difference between a number of frequencies in the first and second sets;

a fringe order calculator for determining a fringe order of the plasma; and a density calculator for determining a plasma electron density of the plasma based on the fringe order.

2. The system according to claim 1, wherein the frequency source comprises a voltage-controlled microwave oscillator.

3. The system according to claim 2, wherein the frequency source further comprises a digital-to-analog convertor for applying a voltage to the voltage-controlled microwave oscillator.

4. The system according to claim 1, wherein the plasma chamber comprises an open resonator immersed in a plasma.

5. The system according to claim 4, wherein the open resonator comprises plural reflectors, wherein all input and output connections are made to only one of the plural reflectors.

6. The system according to claim 1, further comprising a data input device for entering a desired plasma electron density.

7. The system according to claim 6, further comprising:

a plasma generator; and an automatic controller for controlling the plasma generator to produce the desired plasma electron density based on the density calculated by the density calculator.

8. A method for measuring a plasma electron density in a plasma chamber, the method comprising the steps of:

(a) sweeping a signal output from a frequency source in a decreasing frequency direction and providing the decreasing frequency sweep signal to the plasma chamber;

(b) sweeping the signal of the frequency source in an increasing frequency direction and providing the increasing frequency sweep signal to the plasma chamber after providing the decreasing frequency sweep signal;

(c) detecting, via a resonance frequency detector, a first set of resonance frequencies excited by the decreasing frequency sweep;

(d) detecting, via the resonance frequency detector, a second set of resonance frequencies excited by the increasing frequency sweep;

(e) determining a difference between a number of frequencies in the first and second sets;

(f) calculating a fringe order of the plasma; and (g) determining a plasma electron density of the plasma based on the fringe order.

9. The method according to claim 8, wherein the steps (a) and (b) comprise providing frequencies via a voltage-controlled microwave oscillator.

10. The method according to claim 8, wherein the steps (a) and (b) comprise providing frequencies to an open resonator immersed in a plasma.

11. The method according to claim 10, wherein the steps (c) and (d) comprise detecting from plural reflectors, wherein all input and output connections are made to only one of the plural reflectors.

12. The method according to claim 8, further comprising the step of inputting a desired plasma electron density.

13. The method according to claim 12, further comprising the steps of:

generating a plasma in a plasma generator; and controlling the plasma generator to produce the desired plasma electron density based on the density calculated by the density calculator.

* * * * *

UNITED STATES PATENT AND TRADEMARK OFFICE

CERTIFICATE OF CORRECTION

PATENT NO. : 6,861,844 B1
DATED : March 1, 2005
INVENTOR(S) : Verdeyen et al.

It is certified that error appears in the above-identified patent and that said Letters Patent is hereby corrected as shown below:

Title page,
Insert Item -- Related U.S. Application Data
[60] Provisional application No. 60/144,833, filed on Jul. 21, 1999 --

Signed and Sealed this

Twenty-fourth Day of May, 2005

JON W. DUDAS
*Director of the United States Patent and Trademark Office*